Patented Oct. 24, 1939

2,177,197

UNITED STATES PATENT OFFICE 2,177,197

COMPOSITION OF MATTER

Arthur B. Cummins, Plainfield, N. J., assignor to Johns-Manville Corporation, New York, N. Y., a corporation of New York No Drawing. Application March 23, 1936, Serial No. 70,420

5 Claims. (Cl. 134—58)

This invention relates to a composition of matter and particularly to a pulverulent composition for use as a pigmentary material, an insecticide, or a bactericide.

In the preferred embodiment, the invention comprises an integral composition including particles of silica preferably particles of comminuted diatomaceous earth, and the calcined product of the reaction of the silica with a heavy metal flux.

Compounds of heavy metals, by which is meant metals of specific gravity more than 4, are much used as pigments for paints or the like, insecticides, bactericides, fillers or catalyzers. Because of the high specific gravity of such compounds, they are not adapted to occupy as large a volume for a given weight, as desired for a number of commercial purposes. Thus, there is need of means for extending paint pigments, insecticides or bactericides, to increase the effectiveness or modify the properties upon which the commercial use depends, without the preparation of a mere mechanical mixture adapted to permit separation of the extender from the active principle.

It is an object of the present invention to prepare such extended compositions including the active pigment, insecticide, bactericide or the like and to make the extender integral with the active material. Other objects and advantages will appear from the detailed description that follows.

There is selected as the active material to be extended or modified a compound, such as a compound of a heavy metal that, at the temperature of calcination, is adapted to react with the finely divided siliceous material mixed therewith. It will be understood that the term "compound" as used in this connection means a compound of the selected heavy metal that, at or below the temperature of calcination, reacts with siliceous particles, to produce an ingredient chemically combined in the product of the calcination, as, for instance, a silicate of lead, zinc, vanadium or titanium. Thus, lead nitrate is the equivalent of litharge for the present purposes, inasmuch as each of these lead compounds upon calcination with finely divided silica gives a lead silicate.

It will be understood, also, that the invention is not to be limited to any theory of explanation of the results obtained in the calcination. Thus, it is immaterial to the invention whether the calcined product, after cooling, is a solution of the one component such as the metal oxide in silica or a chemical combination of the components, the term "reaction" being used to include either physical solution or chemical combination, as distinguished from mechanical mixing only.

The details of the method and one embodiment of the invention will be specifically illustrated in connection with the calcination of lead oxide with diatomaceous earth, this earth representing the form of silica has been found to give particularly desirable calcination products with the heavy metal compounds.

Finely divided diatomaceous earth retaining its diatomic structure, say, comminuted diatomaceous earth of the grade and state of subdivision commonly used as a filter aid, is mixed intimately with lead oxide. The lead oxide may be of the formula $PbO$, $Pb_3O_4$ or $PbO_2$.

The proportions of reacting materials may be varied within limits, the preferred proportion depending upon the properties desired in the finished product. Thus, the proportion of metal compound is increased, if it is desired to make the finished product have higher pigmentary value or higher density or be more concentrated in the active principle. I have used to advantage proportions of the order of ten to forty parts by weight of metal compound to 100 parts of comminuted diatomaceous earth.

The mixture so made is subjected to calcination at a dull red heat or higher, as, for example, at 1,500 to 1,900° F. In general, the temperature of calcination selected will vary somewhat inversely with the activity as a flux of the selected metal compound. With litharge as the heavy metal flux, the calcinatiton is suitably conducted at a temperature of about 1,800° F.

The calcination is conducted for a sufficient interval to establish the selected maximum temperature substantially uniformly throughout the mixture. Thus, the period of calcination at the maximum temperature may vary from a few minutes to an hour or so.

Conventional calcination equipment may be used, as, for example, a rotary kiln or a muffle furnace.

The resulting product is cooled. It may be slightly milled, as by being rubbed through a screen or disintegrated by passage through a blower, to break up any soft aggregations formed during the calcination. For some purposes, the product may be ground to extreme fineness, as by a disc pulverizer or the like.

There is thus obtained a material that is pink to white or slightly yellowish in color, the exact color depending, in part, upon the proportions used and the temperature of calcination selected.

The product described is adapted for use in establishing color, as, for example, as a pigment in a water paint, as a resistant paint filler, as a filler in various plastic compositions, and as a filter aid for special purposes.

Various substitutions may be made for the lead compound used as the flux in the above example, the selection depending in part upon the properties desired or the uses to which the finished product is to be put.

When the new composition of matter is to be used as a pigmental substance for establishing color, the flux used may be a compound, as defined above, of lead, zinc, bismuth, cadmium, arsenic, antimony, mercury, or other heavy, reactive, originally pigmentary compound or one developing pigmentary property on calcination with silica.

When the finished composition is to be used as an insecticide or bactericide, the compound of the metal used as flux may be one of lead, zinc, chromium, molybdenum, titanium, and vanadium or other insecticidal or bactericidal compound.

As indicated above, the improved products of the present invention have great bulk in proportion to their weight or in proportion to the mass of active material used. Also, the products, when examined microscopically, may be seen to retain the structure of the silica particles initially used, as, for example, the characteristic structure of diatomaceous earth, when such earth constitutes the silica component. Also, the reaction product (solution or chemical combination) of the heavy metal flux and particles of silica is integral, so that the components of the said product may not be separated mechanically or by washing with water or the like.

When used as a pigmentary substance, the novel composition may be incorporated into suitable vehicles and used with other common paint or lacquer ingredients.

As used for an insecticide, the improved composition may be mixed with other ingredients conventionally used for the purpose. Thus, my product may be mixed with water, binders and the like, to form mixtures suitable for spraying. Or, my product may be used dry, as, for instance, as a dust spray.

As a bactericide or germicide the product may be mixed with the material to be sterilized. Advantageously, the resulting mixture is separated as by filtration. Or, the bactericidal composition may be used as a layer in a filter and the material that is to be sterilized or reduced in bacteria content passed through the composition as a layer filtering material.

The effectiveness of my improved product as a bactericide is illustrated by the following data obtained or filtering milk with layers of various materials, used separately, and then determining the bacteria content of the filtrate.

| Medium through which the milk was filtered | Bacteria per cc. of filtrate |
| --- | --- |
| Diatomaceous earth calcined with sodium carbonate (standard filter aid used for purposes of comparison) | 13,750 |
| Diatomaceous earth calcined with 20% of its weight of arsenic trioxide, for 40 minutes, at 1,875° F | 3,250 |
| Diatomaceous earth calcined with 10% of its weight of silver nitrate, for 40 minutes, at 1,875° F | 500 |
| Diatomaceous earth calcined with 30% of its weight of silver nitrate and 20% of finely divided carbon, for 45 minutes, at 1,500° F | 250 |

The effectiveness of the silver compound especially in making a bactericide with the finely divided diatomaceous earth is noteworthy.

When the fineness of subdivision or structure that is characteristic of diatomaceous earth is not necessary in the siliceous base, finely ground semi-crystalline or crystalline silica may be substituted for the diatomaceous earth and heated with the compounds of the class described. However, the finely divided diatomaceous earth is unique in the properties that it imparts to the product of the calcination with the several compounds.

It will be understood that the details given are for the purpose of illustration, not restriction, and that variations within the spirit of the invention are to be included in the scope of the appended claims.

What I claim is:

1. A method of manufacturing a pulverulent composition of matter comprising forming an intimate mixture of finely divided diatomaceous earth and a compound consisting of the oxides and the compounds yielding oxides at the calcination temperature of a heavy metal selected from the group consisting of lead, zinc, bismuth, cadmium, chromium, arsenic, antimony, molybdenum, titanium, vanadium, silver and mercury, said mixture being in the proportions of the order of 10 to 40 parts by weight of said compound to 100 parts of the diatomaceous earth, heating the mixture at a temperature between 1500 to 1900° F. for a sufficient length of time to form a complex product comprising a sufficient amount of unreacted diatomaceous earth to serve as an extender and the chemical reaction product between the compound of the heavy metal and silica of the diatomaceous earth, but heated insufficiently to eliminate the characteristic structure of the diatomaceous earth.

2. A pulverulent composition of matter comprising a complex product of diatomaceous earth and a reaction product of diatomaceous earth and a compound consisting of the oxides of a heavy metal selected from the group consisting of lead, zinc, bismuth, cadmium, chromium, arsenic, antimony, molybdenum, titanium, vanadium, silver and mercury, said compound being present in the composition in the ratio of 10 to 40 parts by weight of compound to 100 parts of diatomaceous earth, and said reaction product being formed by heating the ingredients at an elevated temperature between 1500° to 1900° F. for a sufficient length of time to promote the chemical reaction between the compound and a portion of the diatomaceous earth, but heated insufficiently to eliminate the characteristic structure of the unreacted diatomaceous earth.

3. A pulverulent composition of matter comprising a complex product of diatomaceous earth and a reaction product of diatomaceous earth and lead oxide, said lead oxide being present in the composition in the ratio of 10 to 40 parts by weight to 100 parts of diatomaceous earth and said reaction product being formed by heating the ingredients at an elevated temperature between 1500° to 1900° F. for a sufficient length of time to promote the chemical reaction between the lead oxide and a portion of the diatomaceous earth, but heated insufficiently to eliminate the characteristic structure of the unreacted diatomaceous earth.

4. A pulverulent composition of matter comprising a complex product of diatomaceous earth and a reaction product of diatomaceous earth and zinc oxide, said zinc oxide being present in the composition in the ratio of 10 to 40 parts by weight to 100 parts of diatomaceous earth and said reaction product being formed by heating the ingredients at an elevated temperature between 1500° to 1900° F. for a sufficient length of time to promote the chemical reaction between the zinc oxide and a portion of the diatomaceous earth, but heated insufficiently to eliminate the characteristic structure of the unreacted diatomaceous earth.

5. A pulverulent composition of matter comprising a complex product of diatomaceous earth and a reaction product of diatomaceous earth and silver oxide, said silver oxide being present in the composition in the ratio of 10 to 40 parts by weight to 100 parts of diatomaceous earth and said reaction product being formed by heating the ingredients at an elevated temperature between 1500° to 1900° F. for a sufficient length of time to promote the chemical reaction between the silver oxide and a portion of the diatomaceous earth, but heated insufficiently to eliminate the characteristic structure of the unreacted diatomaceous earth.

ARTHUR B. CUMMINS.